(12) United States Patent
Shaw

(10) Patent No.: US 7,392,274 B2
(45) Date of Patent: Jun. 24, 2008

(54) MULTI-FUNCTION FLOATING POINT ARITHMETIC PIPELINE

(75) Inventor: Steven Shaw, Berkshire (GB)

(73) Assignee: Micron Technology, Inc., Boise, ID (US)

( * ) Notice: Subject to any disclaimer, the term of this patent is extended or adjusted under 35 U.S.C. 154(b) by 848 days.

(21) Appl. No.: 10/786,332

(22) Filed: Feb. 26, 2004

(65) Prior Publication Data

US 2004/0167953 A1    Aug. 26, 2004

Related U.S. Application Data

(62) Division of application No. 09/808,138, filed on Mar. 15, 2001, now Pat. No. 6,965,908.

(51) Int. Cl.
*G06F 7/42* (2006.01)
*G06F 7/38* (2006.01)

(52) U.S. Cl. .............................. 708/505; 708/501
(58) Field of Classification Search ............... 708/501, 708/505
See application file for complete search history.

(56) References Cited

U.S. PATENT DOCUMENTS

| 4,736,335 | A | | 4/1988 | Barkan |
| 4,841,467 | A | | 6/1989 | Ho et al. |
| 5,200,916 | A | | 4/1993 | Yoshida |
| 5,257,215 | A | | 10/1993 | Poon |
| 5,359,548 | A | * | 10/1994 | Yoshizawa et al. .......... 708/505 |
| 5,420,980 | A | | 5/1995 | Pinedo et al. |
| 5,973,705 | A | | 10/1999 | Narayanaswami |
| 5,982,375 | A | | 11/1999 | Nelson et al. |
| 5,995,122 | A | | 11/1999 | Hsieh et al. |
| 6,038,582 | A | * | 3/2000 | Arakawa et al. ............ 708/501 |
| 6,094,668 | A | | 7/2000 | Oberman |
| 6,138,135 | A | | 10/2000 | Karp |
| 6,701,337 | B1 | * | 3/2004 | Ide .............................. 708/501 |

FOREIGN PATENT DOCUMENTS

| GB | 2 353 881 A | 7/2001 |
| WO | WO 01/29768 A2 | 4/2001 |
| WO | WO 01/41073 A1 | 6/2001 |

* cited by examiner

*Primary Examiner*—Chuong D Ngo
(74) *Attorney, Agent, or Firm*—Dickstein Shapiro LLP

(57) ABSTRACT

A scalable engine having multiple datapaths, each of which is a unique multi-function floating point pipeline capable of performing a four component dot product on data in a single pass through the datapath, which allows matrix transformations to be computed in an efficient manner, with a high data throughput and without substantially increasing the cost and amount of hardware required to implement the pipeline.

18 Claims, 10 Drawing Sheets

MULTI-FUNCTION FLOATING POINT ARITHMETIC PIPELINE

This application is a divisional of application Ser. No. 09/808,138, filed on Mar. 15, 2001, now U.S. Pat. No. 6,965,908, issued Nov. 15, 2005, which is hereby incorporated by reference.

FIELD OF THE INVENTION

The invention relates to computer systems, and more particularly to a multi-function floating point arithmetic pipeline optimized for executing matrix transformations, such as required by three-dimensional (3D) information processing.

BACKGROUND OF THE INVENTION

The need for highly realistic graphics in modern computer applications has increased greatly over the past years. Applications such as computer aided design (CAD) and computer games, for example, require realistic and accurate graphical representations of characters, objects, scenery, colors, shading, etc. to provide the computer user with the ability to successfully execute the application in the desired manner.

It has become essential for today's computer applications to use three-dimensional (3D) geometry when simulating the features of the graphic elements that are to be displayed. Typically, each graphic element or object is broken down into a collection/combination of graphic "primitives" such as e.g., lines, triangles, polygons and/or ellipses. Each primitive is comprised of 3D information referred to as vertices. Each vertex of the group of vertices is represented by a floating point number. The vertices will be transformed by matrices (e.g., tessellation, geometric transformations, lighting, projection, etc.).

The complexity of the floating point operations can be illustrated by examining the typical floating point number used in today's graphical computer applications. Referring to FIG. 1, the format for a conventional floating point number 10 is now described. The illustrated format complies with the IEEE standard 754 single precision floating point format. The floating point number 10 comprises a sign bit 12 (denoted as "S"), an exponent portion 14 (denoted as "E") and a mantissa portion 16 (denoted as "M"). Floating point numbers 10 represented in this format have a value V, where V is defined as:

$$V = (-1)^{S-127} * 2^{E} * (1.M) \quad (1)$$

The sign bit 12 (S) represents the sign of the entire number 10, while the mantissa portion 16 (M) is a 23-bit number with an implied leading 1. The exponent portion 14 (E) is an 8-bit value that represents the true exponent of the number 10 offset by a bias, which in the illustrated format is 127. The floating point number 10 may have values V with exponents ranging from −127 to +128. Thus, for each vertex in a graphic component such as a primitive, several calculations are required to properly manipulate the floating point sign bit 12 and the exponent and mantissa portions 14, 16 of the vertex. These calculations are further compounded because each graphic component has several vertices.

Since many of today's computer applications operate in real-time, the transformation of the 3D image and the transformation from 3D to 2D (two-dimensional) must be performed in an expedited manner. Dedicated graphics pipelines are often used to speed up the necessary calculations and transformations. These pipelines comprise floating point arithmetic designed to perform tessellation, geometrical transformations, lighting, clipping, projection, polygon setup and rasterization. Tessellation is the process of breaking down graphic elements into primitives. Geometrical transformations include the translation, rotation and scaling of the primitives. Lighting is the computing, for each vertex, of the result of the interaction between ambient, diffuse or specular light and the primitive's material properties. Clipping involves deleting portions of the primitives that will not fit within the displayable area of the display screen. Projection is the projection of the 3D images onto the display plane. Polygon setup is the computation of colors along the edges of the primitives and rasterization is the transformation of the 3D image to a set of colored pixels.

A vertex engine or shader is typically responsible for the lighting and geometric transformation operations. A repeated feature of these vertex engine operations is the computationally intensive transformation of the floating point vertex data vectors (e.g., single precision floating point numbers 10 illustrated in FIG. 1) using matrix transformations. A key element of the matrix transformation is a three or four component dot product of two vectors. Thus, to speed up the operation of the vertex engine and the overall pipeline, there is a need and desire to perform four component dot product computations as fast as possible. One way to do so, would be to compute the four component dot products during a single pass through the vertex engine—something that is not done in today's computer arithmetic pipelines and systems. Accordingly, there is a need and desire for a floating point pipeline that is capable of computing a four component dot product in a single pass through the vertex engine (i.e., the vertex data passes through the vertex engine a single time and all the required computations are performed during that same time).

There is also a need and desire for a floating point pipeline that is capable of computing a four component dot product in a single pass through the vertex engine without substantially increasing the cost and amount of hardware required to implement the pipeline.

SUMMARY OF THE INVENTION

The invention provides a floating point pipeline that is capable of computing a three or four component dot product in a single pass through the pipeline (i.e., the data passes through the engine a single time and all the required computations are performed during that same time).

The invention also provides a floating point pipeline that is capable of computing a three or four component dot product in a single pass through the pipeline without increasing the cost and the amount of hardware required to implement the pipeline.

The above and other features and advantages are achieved by a scalable engine having multiple datapaths, each of which is a unique multi-function floating point pipeline capable of performing a four component dot product on data in a single pass through the datapath, which allows matrix transformations to be computed in an efficient manner, with a high data throughput and without substantially increasing the cost and amount of hardware required to implement the pipeline.

BRIEF DESCRIPTION OF THE DRAWINGS

The above and other advantages and features of the invention will be more clearly understood from the following detailed description of the invention, which is provided in connection with the accompanying drawings in which.

DETAILED DESCRIPTION OF THE PREFERRED EMBODIMENTS

Figure 2:
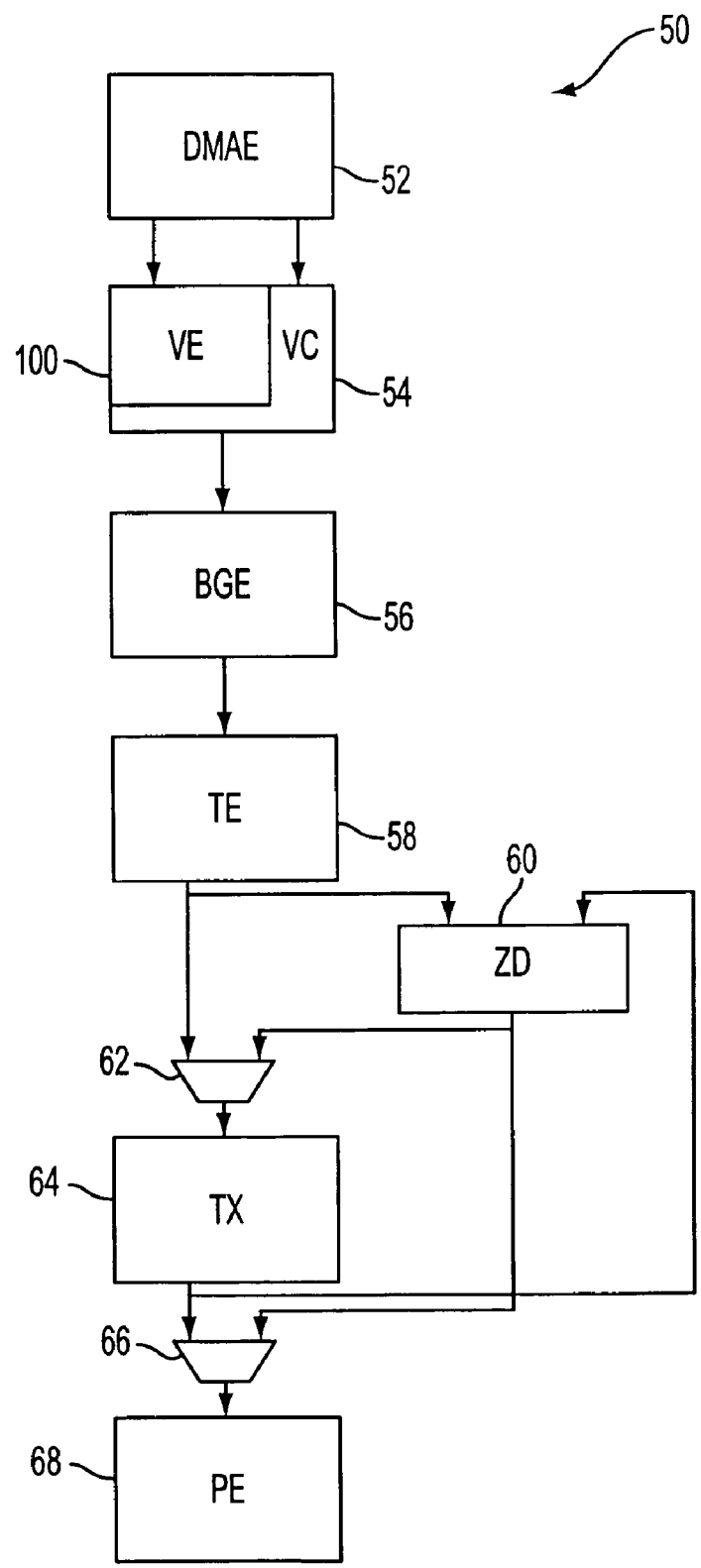
FIG. 2 is a block diagram illustrating an exemplary graphics pipeline constructed in accordance with an exemplary embodiment of the invention.

FIG. 2 is a block diagram illustrating an exemplary graphics pipeline 50 constructed in accordance with an exemplary embodiment of the invention. One stage of the pipeline 50 is the vertex engine 100. As will be described below in more detail, this unique vertex engine 100 includes multiple datapaths, each of which is a multi-function floating point pipeline capable of performing a three or four component dot product during a single pass through the datapath (i.e., the data passes through the vertex engine a single time and the required computations are performed during that same time), which allows vertex transformations to be computed in an efficient manner, with a high data throughput and without substantially increasing the cost and amount of hardware required to implement the pipeline 50. It should be appreciated that the illustrated graphics pipeline 50 is but one of many examples of a processing pipeline that can implement some engine, which implements the floating point pipeline of the invention and that the invention should not be limited to any specific pipeline architecture. Moreover, although the invention is described with respect to a vertex engine that processes vertex data, it should be appreciated that the invention can be used in any system that requires high speed processing of floating point data and thus, the invention is not limited to vertex engines and the processing of vertex data.

Figure 10:
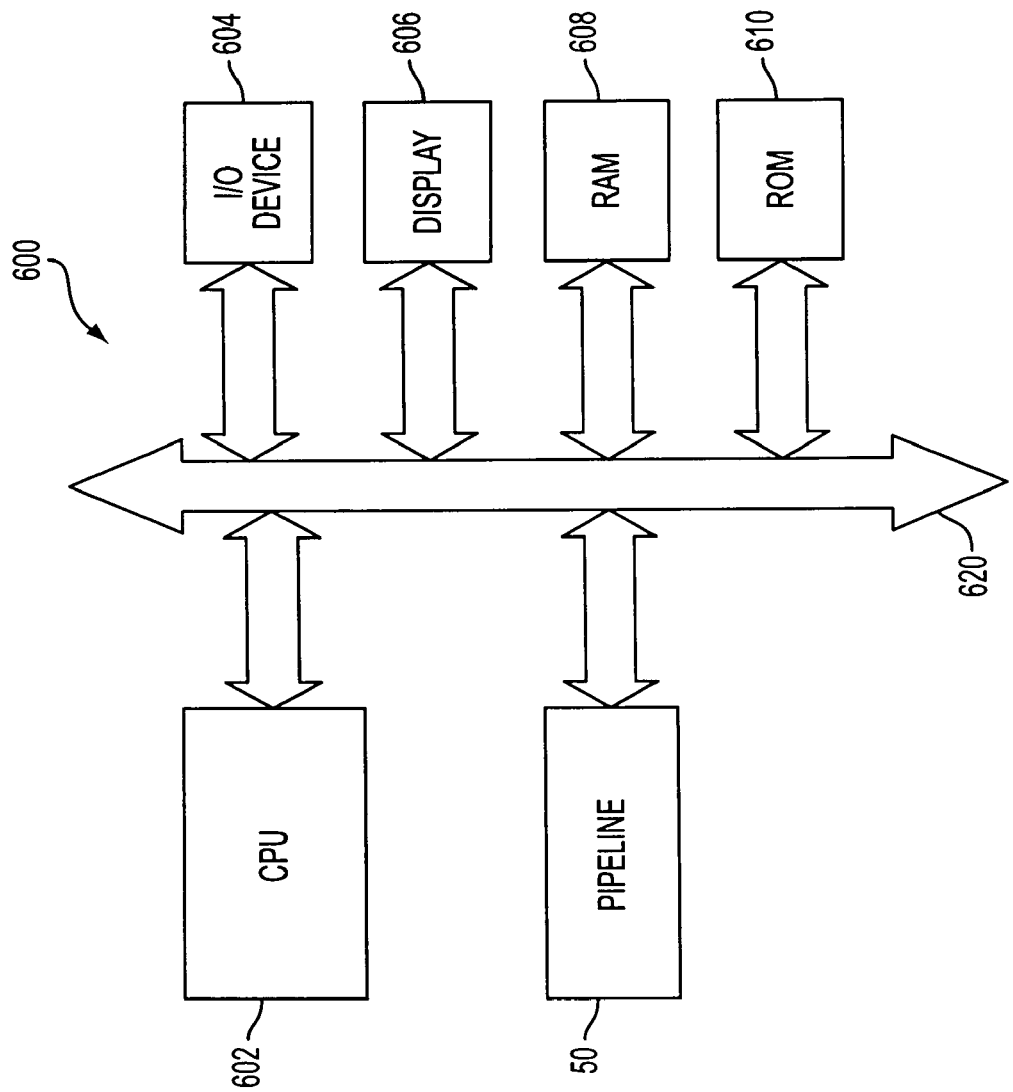
FIG. 10 is a block diagram illustrating an exemplary processor-based system utilizing a graphics pipeline constructed in accordance with the invention.

The graphics pipeline 50 comprises a dynamic memory access (DMA) engine 52 (referred to herein as "DMAE 52"), the vertex engine (VE) 100, a vertex cache (VC) 54, background geometry engine (BGE) 56, triangle engine (TE) 58, z-datapath(ZD) 60, texture engine (TX) 64, pixel engine (PE) 68 and two multiplexers 62, 66. The DMAE 52 serves as the first stage of the pipeline 50. The DMAE 52 executes a linked list of commands that are generated by a host processor (FIG. 10). These commands cause the DMAE 52 to read data from system memory, process the data and write it to data output FIFO (first-in first-out) buffers. By executing the list of commands, the DMAE 52 is indirectly responsible for generating a stream of data for the BGE 56. The data can include processed vertices, video data, and pixel register writes. The DMAE 52 uses a vertex reference called an index to gather parts of a vertex from scattered data structures in memory.

Each vertex is processed by a vertex shader program executing on the vertex engine 100 (described in more detail below). The VE 100 may be a 3-way super-scalar pipelined processor. Operating under the control of a stored computer program, the VE 100 reads vertex and video data from the DMAE 52 output data FIFO, processes it (e.g., transforms data with given matrices, and performs operations such as lighting, geometric transformation, and texture coordinate transformation), and writes the results to a vertex engine memory such as a random access memory (RAM). The VC 54 generates a data stream for the BGE 56 by combining data read from the vertex RAM with control data from a DMA command FIFO.

The BGE 56 serves as a final stage of hardware transform and lighting, and performs functions that require consideration of all the vertices which make up a primitive. This includes clipping to the near Z-plane (if necessary), homogeneous divide, screen transform, backface culling, viewport culling and zero pixel culling. State and vertex information used by the BGE 56 is received from the VE 100 and processed by the BGE 56, which in turn sends them to the TE 58. The TE 58 performs the task of breaking up a primitive into typically 4*2 pixel groups and calculates setup terms for use by the rest of the pipeline 50. The TE 58 handles point, line, triangle and rectangle primitives. The BGE 56 provides the transformed vertex data and instructs the TE 58 where to load it and when to render a primitive.

The ZD 60 performs stencil and Z-compare operations. Stencil is typically a multipurpose 8-bit buffer used for shadows and reflections. The Z buffer keeps track of the depth of each pixel in the scene as it is rendered. The Z-compare operation rejects pixels that are hidden behind previously drawn pixels in a frame. The TX 64 supports up to 8 textures by sequentially processing each active texture lookup for groups of 4 pixels. The TX 64 has a single unified texture cache that can simultaneously contain up to 8 textures. The first multiplexer 62 allows data to be input into the TX 64 directly from the TE 58 or from the ZD 60 in accordance with control signals generated by the host processor.

The PE 68 functions as the final stage of pixel processing and performs e.g., dither and pixel formatting operations. The PE 68 also writes pixels back to the frame buffer via a memory controller. The PE 68 may perform other operations, but a discussion of such operations is not needed to practice the invention. When performing operations on the data within the ZD 60, the PE 68, via the second multiplexer 66, selects data from the ZD 60 to queue-up reads ahead of the pixel data, which arrives later from the TX 64. For other operations, data from the texture engine 64 is selected and queued-up reads ahead of the pixel data, which in this case arrives as an output of the ZD 60. As noted above, the vertex engine within the illustrated graphics pipeline 50 is but one of many pipeline architectures that can implement and benefit from the floating point pipeline of the invention (described below in more detail with reference to FIGS. 3-9).

Figure 3:
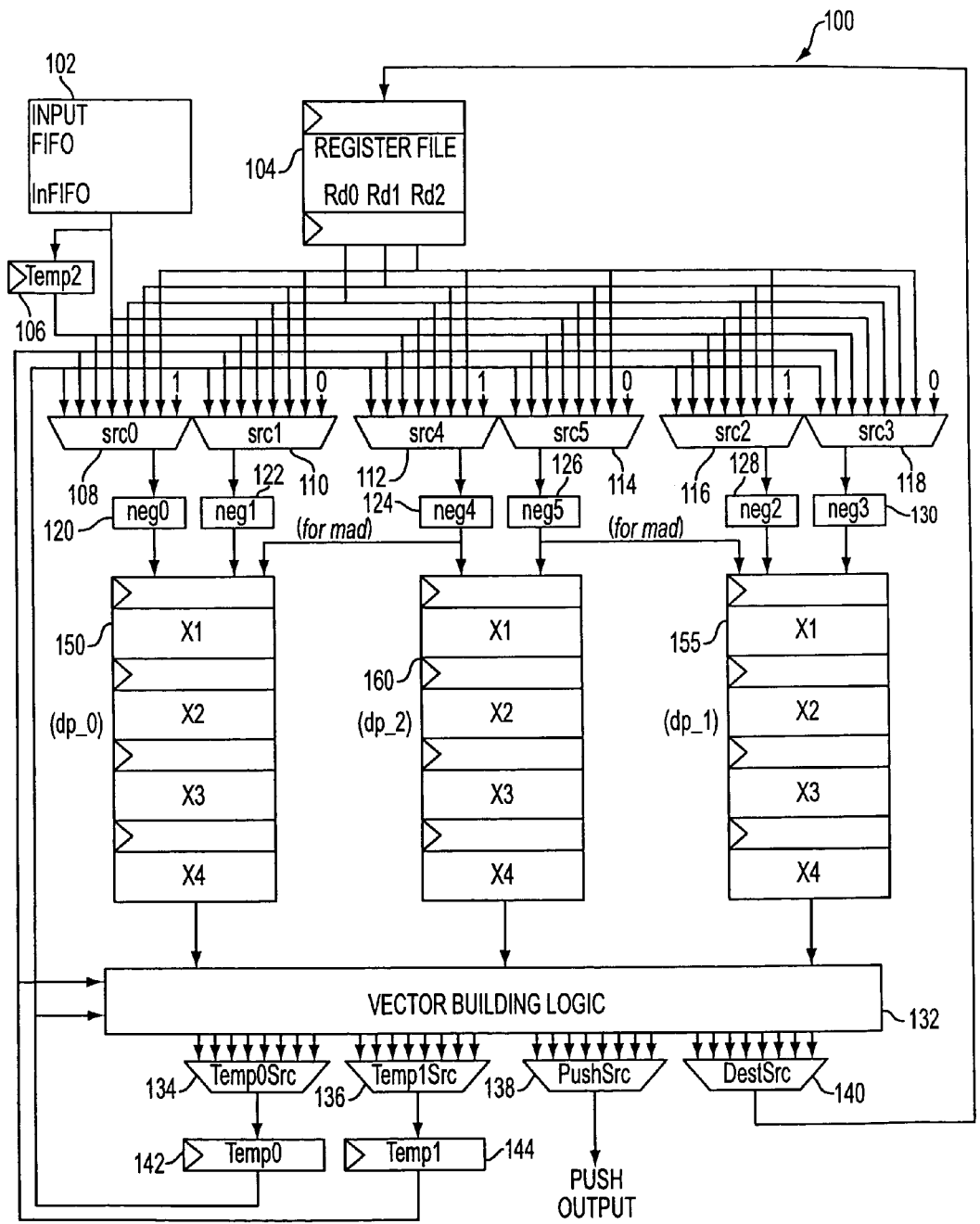
FIG. 3 is a block illustrating an exemplary vertex engine used in the pipeline illustrated in FIG. 2.

FIG. 3 is a block illustrating an exemplary VE 100 used in the pipeline 50 illustrated in FIG. 2. It should be noted that the pipeline 50 and the VE 100 will usually communicate with a graphics application program interface (API) such as the commercially available Microsoft® DirectX product. As such, the pipeline 50 and its many stages must be capable of complying with the specifications and functional requirements of the API. It should be noted that any API may be used and that the invention is not limited to the Microsoft DirectX API. The vertex engine 100 has been designed as a hardware implementation of the vertex processing features of the Microsoft® DirectX specification, but is equally suitable for use with other APIs.

Accordingly, the pipeline 50 would be required to use 128-bit wide data buses, with each 128-bit vector consisting of four 32-bit IEEE 754 standard floating point numbers or scalars SCALAR_X, SCALAR_Y, SCALAR_Z, SCALAR_W. The four scalars SCALAR_X, SCALAR_Y, SCALAR_Z, SCALAR_W are mapped to the 128-bit wide vector data as illustrated below in Table I. A register file (described in more detail below) is used to map stored data to any scalar of the read vector bus.

TABLE I

|  | SCALAR_X | SCALAR_Y | SCALAR_Z | SCALAR_W |
|---|---|---|---|---|
| bits of vector | 31:0 | 63:32 | 95:64 | 127:96 |

The pipeline 50, via its datapaths 150, 155, 160, will perform a series of operations described in the Microsoft® DirectX specification. Only those operations needed to describe the operation of the invention, such as three and four component dot products, will be discussed (described below with reference to FIGS. 4 to 8). More information about Microsoft® DirectX can be found at http://msdn.microsoft.com/directx.

The invention uses the following premise to reduce the cost and hardware of the VE 100 and increase its data throughput. The nature of the vertex data (i.e., its floating point format illustrated in FIG. 1) is such that a minimal loss of precision in the floating point arithmetic will not impact the resulting visual image. This minimal loss of precision, however, will result in a significantly improved data throughput from the VE 100 and thus, the pipeline 50. Consequently, for all single floating point operations (e.g., multiply or addition) the arithmetic result from the datapaths 150, 155, 160 will be guaranteed to equal rt or (rt−1), where "rt" is the true (i.e., meets the IEEE 754 standard) rounded-to-zero floating point mantissa value prior to normalization to build the IEEE 754 standard result. Thus, the accuracy of the VE 100 floating point instructions can be expressed as illustrated in Table II.

TABLE II

| Instruction | Accuracy |
|---|---|
| Multiply (mul) | rt >= ra >= (rt − 1) |
| Add (add) | ra = rt |
| Multiple-Add (muladd) | rt >= ra >= (rt − 1) |
| Three component dot product (dp3) | rt >= ra >= (rt − 4) |
| Four component dot product (dp4) | rt >= ra >= (rt − 5) |

In Table II "rt" is the true rounded-to-zero pre-normalization mantissa value and "ra" is the actual mantissa value computed by the datapath 150, 155, 160.

Referring again to FIG. 3, the illustrated VE 100 comprises an input FIFO 102, register file 104, temporary registers 106, 142, 144, ten source multiplexers 108, 110, 112, 114, 116, 118, 134, 136, 138, 140, six negators 120, 122, 124, 126, 128, 130, three datapaths 150, 155, 160 and vector building logic 132.

In one embodiment, the register file 104 is a 128*128-bit memory with one write port (unlabeled) and three read ports (RD0, RD1, RD2). Data from the DMAE 52 (FIG. 2) is queued for the VE 100 in the input FIFO 102 and popped from the FIFO output INFIFO when commanded/controlled by the control program. Popped data can be stored temporarily in temporary register 106 (TEMP2) for use in subsequent passes through the VE 100. The first six source multiplexers 108, 110, 112, 114, 116, 118 (also denoted as SRC0, SRC1, SRC4, SRC5, SRC2, SRC3, respectively) are controlled by the control program to select the data source for each of the datapaths 150, 155, 160. Potential sources include one of the three register file read port outputs RD0, RD1, RD2, one of the three temporary registers 106, 142, 144 (respectively denoted as TEMP2, TEMP0 and TEMP1), the output INFIFO or a constant value (e.g., 0.0 or 1.0).

The outputs of the first six source multiplexers 108, 110, 112, 114, 116, 118 are respectively sent to the negators 120, 122, 124, 126, 128, 130, where they may be negated (i.e., positive number converted to a negative number, etc.) if desired by the control program. Negation merely involves inverting the sign bit of each scalar. The data, whether negated or not, is then passed to one of the three datapaths 150, 155, 160 (also denoted as DP_0, DP_1 and DP_2). The datapath results, after passing through vector building logic 132 and source multiplexers 134, 136, 138, 140 (also denoted as TEMP0SRC, TEMP1SRC, PUSHSRC, DESTSRC), can be routed to one of four possible destinations—temporary registers 142, 144, the BGE 56 (FIG. 2) via the PUSH OUTPUT and the register file 104.

The vector building logic 132 is responsible for building 128-bit vectors for the possible destinations. The result for a destination can be built from the outputs of the datapaths 150, 155, 160 or from the outputs of the temporary register 142, 144 as determined by the control program. The output from the temporary registers 142, 144 may be used during accumulation operations. The control program controls the multiplexers 134, 136, 138, 140 to send the correct source of the vector data to the appropriate destination.

Figure 4:
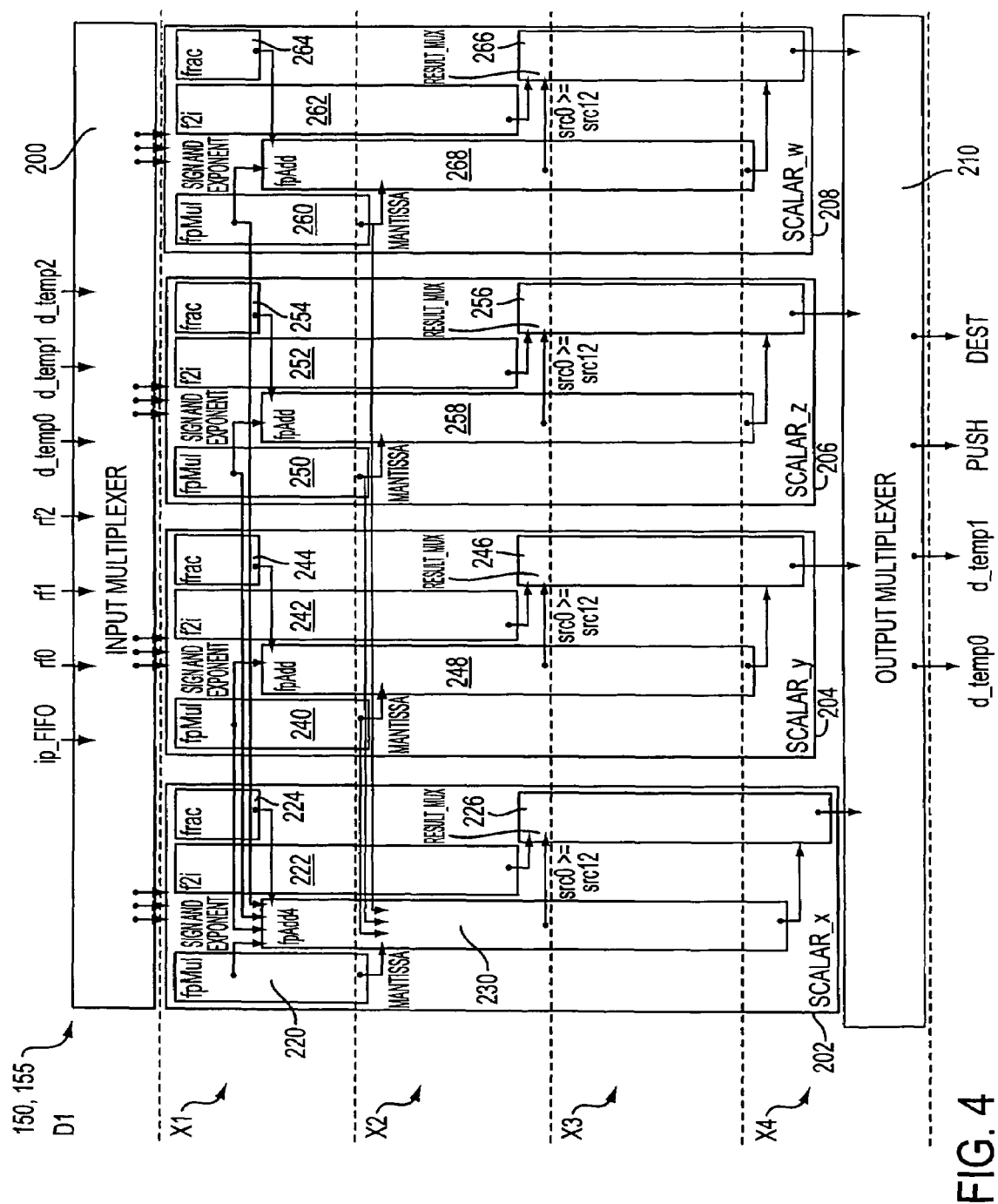
FIG. 4 is a block diagram illustrating an exemplary datapath used in the vertex engine illustrated in FIG. 3.

In a desired embodiment of the invention, the datapaths 150, 155 are identical. FIG. 4 is a block diagram illustrating an exemplary datapath 150, 155 used in the VE 100 illustrated in FIG. 3. Since it is desired that the datapaths 150, 155 be identical, the datapaths 150, 155 are described solely with reference to datapath 150 for convenience purposes. The illustrated datapath 150 has an input stage D1 and four processing stages X1, X2, X3, X4.

Referring to FIGS. 2-4, the input stage D1 includes an input multiplexer 200. The multiplexer 200 inputs FIFO data IP_FIFO from the output INFIFO of the FIFO 102. As noted above, this 128-bit data IP_FIFO placed into the FIFO 102 by the DMAE 52. The multiplexer 200 inputs register file data RF0, RF1, RF2 from the read ports RD0, RD1, RD2 of the register file 104, respectively. The register file data RF0, RF1, RF2 is part of the 128*128-bit data stored in the register file 104. The multiplexer 200 inputs temporary data D_TEMP0, D_TEMP1, D_TEMP2 from the three temporary registers 106, 142, 144, respectively.

The 128-bit wide datapath is subdivided into four 32-bit wide scalar subsections 202, 204, 206, 208, with four pipeline stages X1, X2, X3, X4, such that each section 202, 204, 206, 208 operates on a respective scalar SCALAR_X, SCALAR_Y, SCALAR_Z, SCALAR_W. The number of pipeline stages is illustrated as typical of that required for implementation in current technology and the invention is not to be limited to the number illustrated. The majority of the instructions performed in the datapath 150, 155 operate solely within the confines of one scalar (e.g., one scalar subsection 202, 204, 206, 208). For example, a multiply-add instruction performs four muladd operations in parallel, one for each scalar SCALAR_X, SCALAR_Y, SCALAR_Z, SCALAR_W. In general neither input or output data has to be passed between scalars SCALAR_X, SCALAR_Y, SCALAR_Z, SCALAR_W or scalar subsections 202, 204, 206, 208.

The two dot-product instructions (dp3/dp4) perform floating point multiplies in three or four of the scalars SCALAR_X, SCALAR_Y, SCALAR_Z, SCALAR_W and those results are summed to produce a single 32-bit result (which is subsequently copied to fill the 128-bit result). Thus, one scalar subsection 202, 204, 206, 208 must include a four-input floating point adder module 230 (also denoted as "fpAdd4") to complete these instructions. The remaining subsections 202, 204, 206, 208 will use a two-input floating point adder module 248, 258, 268 (also denoted as "fpAdd"). Other than the type of adder module used, the subsections 202, 204, 206, 208 are substantially identical. In the illustrated embodiment, the four-input adder module 230 has been arbitrarily assigned to the first scalar subsection 202 (e.g., SCALAR_X). It should be appreciated that the four-input adder module 230 could have been assigned to any of the subsections 202, 204, 206, 208 and the invention is not to be limited to the illustrated embodiment.

Each scalar subsection 202, 204, 206, 208 also includes a floating point multiplier module 220, 240, 250, 260 (also denoted as "fpMul"), floating point-to-integer converter module 222, 242, 252, 262 (also denoted as "f2i"), fractional module 224, 244, 254, 264 (also denoted as "frac"), and a result multiplexer 226, 246, 256, 266 (also denoted as "result_ mux"). FIG. 4 illustrates the type of data (e.g., sign, mantissa and exponent) that is passed between the modules of the scalar subsections 202, 204, 206, 208. The operations and data flow of these modules will be described in more detail below with reference to FIGS. 5 to 8.

The last component in the datapath 150 is the output multiplexer 210. The output multiplexer 210 inputs data from each scalar subsection 202, 204, 206, 208 and has four data outputs D_TEMP, D_TEMP1, PUSH and DEST. As noted above, the temporary data D_TEMP0, D_TEMP1 are respectively routed to temporary registers 142, 144. The push data PUSH is sent to the BGE 56 while the destination data DEST is sent to the register file 104. All of the output data D_TEMP0, D_TEMP1, PUSH and DEST are 128-bit vectors. Similar to the input multiplexer 200, the output multiplexer 210 is controlled by the control program.

Figure 1:
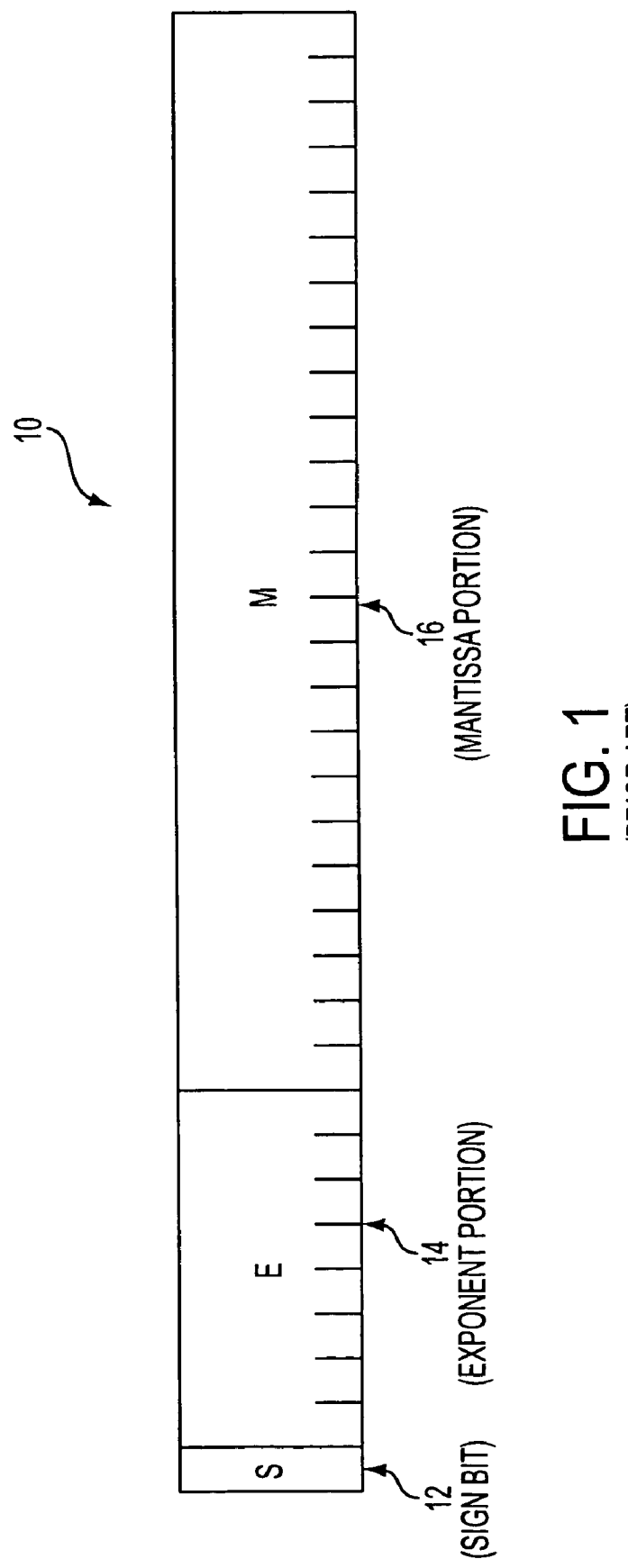
FIG. 1 is an illustration of a conventional format for a floating point number.

It should be noted that all the floating point modules within the datapath 150 units adhere to a subset of the IEEE 754 standard for single precision floating point numbers 10 (FIG. 1). The following situations are areas where the IEEE standard and the requirements of the VE 100 diverge. If an exponent is zero, then the floating point value V of the number is 0.0 (i.e., the VE 100 does not recognize denormalized numbers. In addition, if the exponent is 255 then the floating point number is deemed to be infinity, regardless of its mantissa (i.e., the VE 100 has no concept of not an arithmetic number or "NaNs"). The VE 100 operations should round to zero. The IEEE standard states that in this mode a result should overflow to the maximum representable value (i.e., exponent=254, mantissa=all 1's). The VE 100 implementation overflows to an exponent equal to 255 (i.e., ±infinity).

Figure 5:
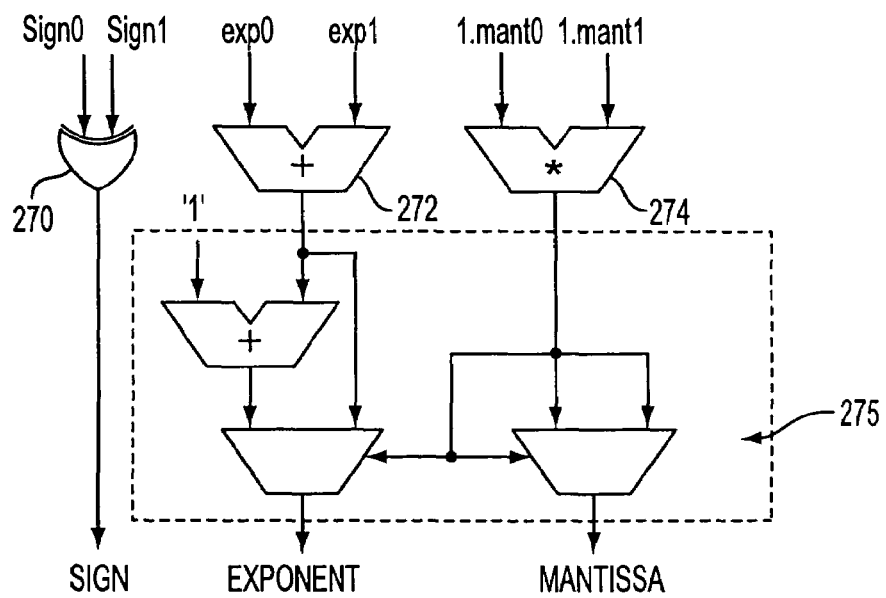
FIG. 5 is a block diagram illustrating an exemplary floating point multiplier module used in the datapath illustrated in FIG. 4.

FIG. 5 is a block diagram illustrating an exemplary floating point multiplier module 220, 240, 250, 260 used in datapath 150 and datapath 155 illustrated in FIG. 4. In a desired embodiment, each multiplier 220, 240, 250, 260 is identical. Thus, for convenience purposes, the multipliers 220, 240, 250, 260 are described with reference to multiplier 220. The multiplier 220 includes an exclusive OR gate 270 (referred to herein as "XOR 270"), adder 272 and a fixed point multiplier 274. The inputs into the multiplier 220 are two 32-bit floating point scalars that are derived from two 128-bit vectors that are input into the datapath 150 (FIG. 4) from one of the many possible sources. Hereinafter, to aid in the description of the multiplier module 220, SIGN0, EXP0 and MANT0 refer to the sign bit, exponent and mantissa portions of the scalar mapped from the first input vector and SIGN1, EXP1 and MANT1 refer to the sign bit, exponent and mantissa portions of the scalar mapped from the second input vector.

The inputs to the XOR 270 are SIGN0 and SIGN1. The output of the XOR 270 is the sign bit SIGN of the resulting floating point number after the multiplication. The inputs to the adder 272 are EXP0 and EXP1. The output of the adder 272 is the pre-normalization exponent portion EXPONENT of the resulting floating point number after the multiplication. The inputs to the multiplier 274 are 1.MANT0 and 1.MANT1. The output of the multiplier 274 is the pre-normalization mantissa portion MANTISSA of the resulting floating point number after the multiplication.

The XOR 270, adder 272 and multiplier 274 are the "core" of the multiplier module 220. The components within block 275 are typically required to normalize the result for output in IEEE 754 format (It should be noted that since the result from the fixed point multiplier 274 will always be ≧1.0 and <4.0, if normalization is required at all it will consist of a single shift to the right of the mantissa and an increment of the exponent). Referring to FIG. 4 it can be seen that the result from the multiplier module 220 is routed through the adder module 230 (so as to minimize the number of 32-bit buses passed through the pipeline). The adder module 230 has its own normalize stage at the back-end and thus, the multiplier 220 result can be normalized by that hardware. Consequently, the implementation of the multiplier module 220 consists of just the XOR 270, adder 272 and multiplier 274. This saves hardware and increases the speed of the multiplier module 220 (as well as the other multiplier modules 240, 250, 260).

The fixed point multiplier 274 has two 24-bit inputs, giving the multiplier 274 a 48-bit result. The implementation of such a multiplier 274 would be costly in terms of gate logic and so there is a strong case for looking to significantly reduce the gate count at the cost of a limited loss in precision. A target was set to design a multiplier that would achieve a result rounded to zero, accurate to 22 bits of precision in the mantissa (pre-normalization). That is, an error in the least significant bit (1 sb) of the mantissa only is allowed. Truncating the addends in the multiplier adder tree reduces gate count. Analysis concluded that truncating the least significant 18 bits gave us a result slightly better than that required, but a cheaper option would be to truncate the least significant 19 bits and add 1 at the carry-in of bit 22, bit 21 or bit 20 of the multiplier's adder tree.

The result of the exponent addition at adder 272 will typically be available to the adder module 220 in approximately half the time it takes to generate the result of the fixed point multiplication from multiplier 274 prior to being passed to the adder module 230. The implication of these timings is discussed below in the description of the adder modules 230.

Figure 6:
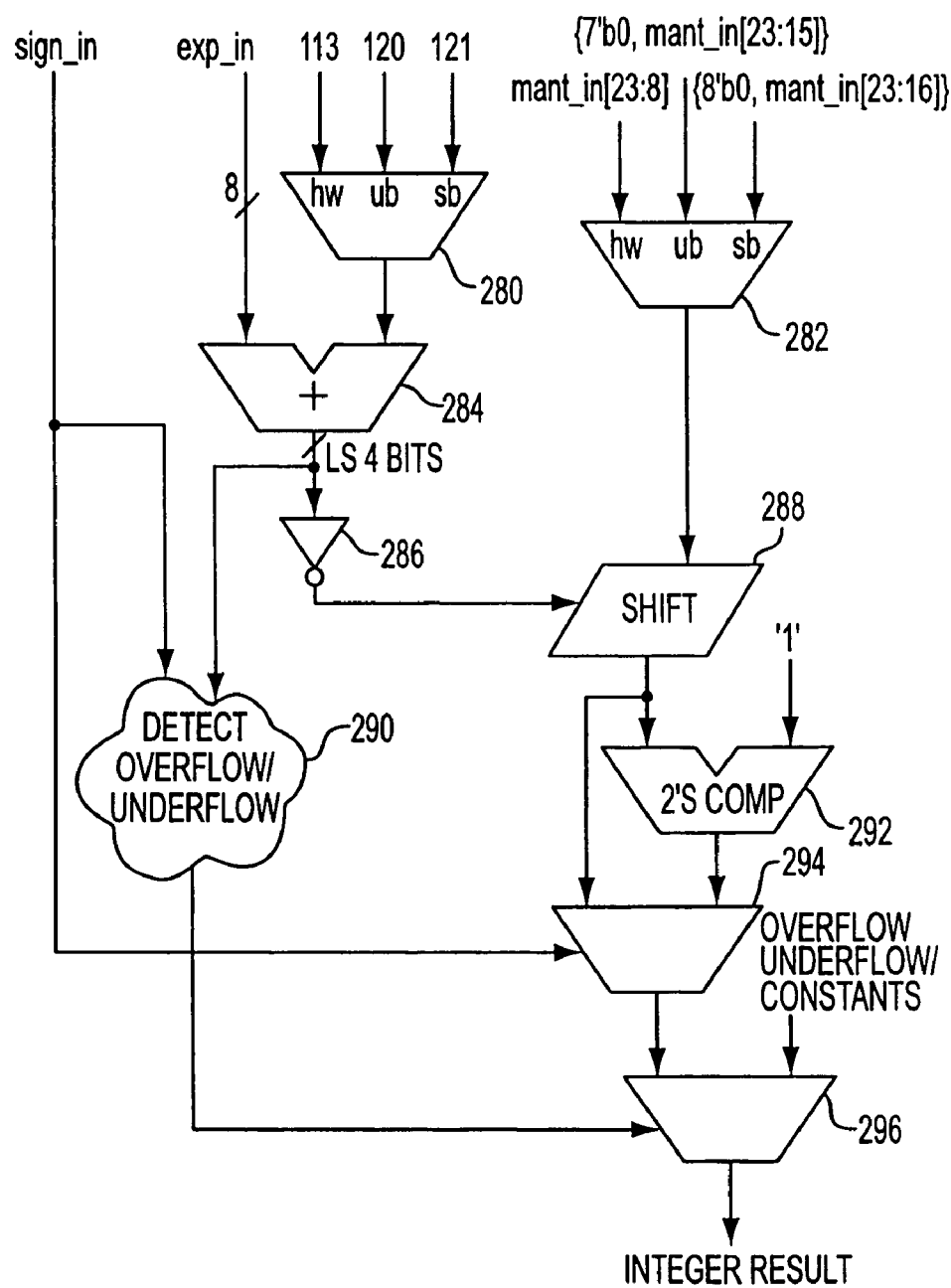
FIG. 6 is a block diagram illustrating an exemplary floating point to integer converter module used in the datapath illustrated in FIG. 4.

FIG. 6 is a block diagram illustrating an exemplary floating point to integer converter 222, 242, 252, 262 used in the datapath 150 and datapath 155 illustrated in FIG. 4. In a desired embodiment, each converter 222, 242, 252, 262 is identical. Thus, for convenience purposes, the converters 222, 242, 252, 262 are described with reference to converter 222. The floating point to integer converter 222 will convert a floating point number to a signed/unsigned integer of any bit size up to 32 bits. In keeping with the present example, the floating point number to be converted is assumed to comply with the IEEE 754 standard (FIG. 1). The exemplary converter illustrated in FIG. 6 converts to unsigned byte, signed half-word or signed byte. The size of the integer is fully programmable and the invention is not limited to the illustrated embodiment.

The converter 222 includes two input multiplexers 280, 282, an adder 284, inverter 286, a shifter 288, detection logic 290, 2's complement module 292 and two output multiplexers 294, 296. Similar to the other components of the pipeline, the four multiplexers 280, 282, 294, 296 of the converter 222 are controlled by the control program. The input to the first input multiplexer are three constants having the values of 113, 120 and 121. These constants allow the converter 222 to convert to a half-word ("HW"), unsigned byte ("UB") or signed byte ("SB") integer, respectively.

The input to the second multiplexer 282 are portions of the mantissa of the floating point number to be converted. The first mantissa input portion includes bits 23 through 8 ("MANT_IN[23:8]"). This first mantissa input portion is used when the floating point number is to be converted to a half-word integer. The second mantissa input portion includes bits 23 through 15 ("MANT_IN[23:15]") zero extended to a width of 16 bits. This second mantissa input portion is used when the floating point number is to be converted to an unsigned byte integer. The third mantissa input portion includes bits 23 through 16 ("MANT_IN[23:16]") zero extended to a width of 16 bits. The third mantissa input portion is used when the floating point number is to be converted to a signed byte integer.

These inputs were determined from the following calculations. The following description is for a conversion to a signed integer, but it can be simply modified for conversion to an unsigned integer. A constant value, k, is added to the biased exponent of the input floating point number ("FP_IN") such that:

(2) bias+k=255−n, where bias=127 (the standard bias for the IEEE 754 standard), and thus, (3) k+n=128, where the maximum number representable by the signed integer format is $2^n-1$; thus, for a signed 8-bit integer (max number is $2^7-1$), k=121.

The floating point number is outside the integer range if:

(4) EXP_IN+k≧256 or (5) EXP_IN+k=255, unless SIGN_IN=1 and MANT_IN=0 (where SIGN_IN is the sign bit, EXP_IN is the exponent portion and MANT_IN is the mantissa portion of FP_IN).

Furthermore if EXP_IN+k<255−n, then −1.0<FP_IN<+1.0 and the integer output must be zero.

The following shift is then performed:

(6) 1. MANT_IN<<x, where x is the 1's complement of bits[$\log_2 n$:0] of EXP_IN+k, with the result being the integer part (or it's 2's complement when FP_IN is negative) of the resulting number. Therefore, by adding the appropriate constant at the head of converter 222, a single path (e.g., shifter 288, 2's complement module 292) can be implemented to do multiple conversions.

The output of the first input multiplexer 280 is input into adder 284. The second input of adder 284 is the exponent portion EXP_IN of the floating point number to be converted. The output of the adder 284 is input into the detect logic 290 and is also inverted by inverter 286 and input into the shifter 288. The output of the second input multiplexer 282 is also input into the shifter 288. The output of the shifter 288 is input into the 2's complement module 292. The output of the shifter 288 is also input into the first output multiplexer 294, which also inputs the output of the 2's complement module 292 and the sign bit SIGN_IN of the input floating point number.

The detect logic 290 also inputs the sign bit SIGN_IN and determines if there has been an underflow or overflow in the adder 284 as described above. The output of the detect logic 290 is input into the first output multiplexer 294. The output of the first output multiplexer 294 and overflow/underflow constants are input into the second output multiplexer 296, which is controlled to output the integer result INTEGER RESULT in accordance with the desired integer format and equations (2) to (6) above.

Figure 7:
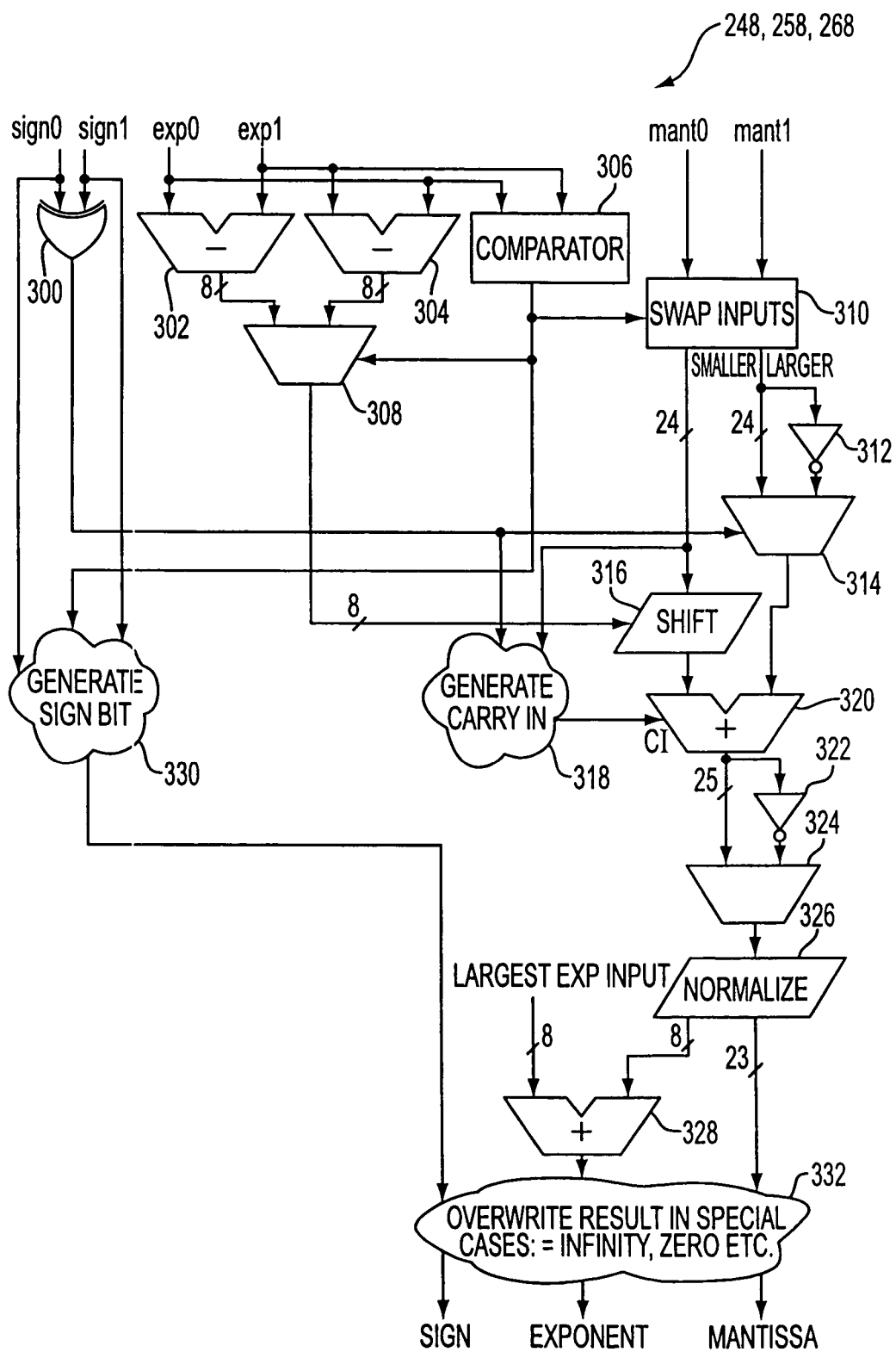
FIG. 7 is a block diagram illustrating an exemplary two-input floating point adder module used in the datapath illustrated in FIG. 4.

FIG. 7 is a block diagram illustrating an exemplary two-input floating point adder module 248, 258, 268 used in datapath 150 and datapath 155 illustrated in FIG. 4. In a desired embodiment, each adder module 248, 258, 268 is identical. Thus, for convenience purposes, the adder modules 248, 258, 268 are described with reference to adder module 248. The adder module 248 includes an exclusive OR gate 300 (hereinafter "XOR 300"), two subtraction units 302, 304, a comparator 306, three multiplexers 308, 314, 324, two inverters 312, 322, an input swapper unit 310, shifter 316, two adder units 320, 328, a normalize unit 326, sign bit generate logic 330, carry in generate logic 318 and output logic 332.

The module 248 is designed to input two floating point numbers. The first floating point number has a sign bit SIGN0, exponent portion EXP0 and a mantissa portion MANT0. These are the outputs of the multiply unit in the same scalar. The second floating point number has a sign bit SIGN1, exponent portion EXP1 and a mantissa portion MANT1. This is a floating point data item selected by the input multiplexer 200 (FIG. 4). The output of the adder module 248 is a sign bit SIGN, exponent portion EXPONENT and mantissa portion MANTISSA of the resulting floating point number. The result of the adder module 248 is designed to achieve a round to zero result in accordance with the IEEE 754 standard.

The two sign bits SIGN0, SIGN1 are input into the XOR 300 and the sign bit generate logic 330. The two exponent portions EXP0, EXP1 are input into the two subtraction units 302, 304 and the comparator 306. The first subtraction unit 302 performs an EXP0-EXP1 operation, while the second subtraction unit 304 performs an EXP1-EXP0 operation. The outputs of the subtraction units 302, 304 are input into the first multiplexer 308 along with the output of the comparator 306. The output of the comparator 306 is also input into the input swapper unit 310, which sends the larger number's mantissa portion LARGER to the second multiplexer 314 and first inverter 312 and the smaller number's mantissa portion SMALLER to the shifter 316 based on the comparator 306 output. The first multiplexer 308 outputs the amount by which SMALLER should be shifted to the shifter 316 where the amount is the EXP0-EXP1 result or the EXP1-EXP0 result based on the comparator 306 output.

The outputs of the second multiplexer 314 and the shifter 316 are input into the adder unit 320 along with the generated carry in CI from the carry in generate logic 318. The output of the adder unit 320 is input into the second inverter 322 and the third multiplexer 324. The output of the third multiplexer 324 is input into the normalize unit 326. 8-bits (the amount the output of multiplexer 324 had to be shifted to normalize) of the normalize unit 326 are output to the second adder unit 328 and 23-bits of the normalize unit 326 (the normalized result such that the most significant 1 is at bit 23) are input to the output logic 332. The second adder unit 328 also inputs the largest exponent EXP0 or EXP1 as determined by the comparator 306 and outputs a provisional exponent result to the output logic 332. The output of the sign bit generate logic 330 is also input into the output logic 332. The output logic 332 uses its inputs to construct the resultant output floating point number's sign bit SIGN, exponent portion EXPONENT and mantissa portion MANTISSA.

The efficiency of the adder module 248 can best be understood by a comparison with a typical floating point adder module. In a typical adder, the data flow would include the following steps: (1) establish the difference between the input exponents EXP0 and EXP1, tentatively set the result exponent to the larger input exponent, and identify the larger input number as that which has the larger exponent or, if the exponents are equal, has the larger mantissa; (2) if the signs of the two input numbers differ then generate the 2's complement of the smaller numbers mantissa; (3) shift the mantissa of the smaller number (determined in step 1) by the difference in the exponents (as calculated in step 1), where the shifted out bits are reserved for use when calculating the rounding bit; (4) compute the sum of the mantissa (the result will always be positive); (5) normalize the result of the sum such that the most significant 1 is at bit 23; (6) round the normalized result (this might lead to the result overflowing such that the most significant 1 is at bit 24. In this case the result must be normalized); and (7) compute the result—the sign bit is the sign of the larger number, the number of shifts required to normalize (step 5) modifies the provisional result exponent (step 1) and the mantissa is the rounded result calculated in step 6.

The typical adder module design was found to require in the order of 20% longer to compute the result. Thus, optimizations had to be made. The one factor of the typical design causing the greatest overhead was using a generic design suitable for all rounding modes and full compliance with the IEEE 754 standard. By targeting a single rounding mode ("round to zero" in the exemplary design), the design illustrated in FIG. 7 was developed and the following improvements were made.

The EXP0-EXP1 and EXP1-EXP0 operations are calculated in parallel and the positive result is selected to control the mantissa shift. This removes a 2's complement unit from this path at minimal area cost. When the adder module is integrated into the full datapath, given the different times at which the exponents and mantissa are available, this change moves the critical path from the "exponent path" to the "mantissa path." In addition, the typical design requires a 2's complement of the smaller number's mantissa when the input signs differ. In the present embodiment, the 2's complement unit is replaced by a straight inverse of the larger number's mantissa (via the first inverter 312) with further correction built into the carry in generate logic 318. Moreover, the inverse is done in parallel (rather than in series) with the shift (via shifter 316). In the present embodiment, logic used to perform the rounding to zero operation is built into carry in generate logic 318 and so a final 24-bit adder unit in the "mantissa path" is not required to complete rounding. Thus, the embodiment illustrated in FIG. 7 saves logic and enhances the performance of the adder module 248 when compared to typical 2-input adder modules.

The carry in CI that is input to the mantissa adder unit 320 is determined by considering the bits shifted out from the smaller number's mantissa SMALLER and the sign bits SIGN0, SIGN1 of the two input floating point numbers, as follows:

i) For numbers with different signs and different exponents—
If the smaller fractional value has been rounded towards zero (i.e., non-zero values shifted out) then that value is added to the two's complement of the other addend (i.e., carry in=1 and larger number's mantissa is inverted). The result is <0 and is rounded towards negative infinity with respect to the full precision exact result. Thus, the inverse or one's complement of this result is the magnitude of the exact result rounded towards zero. If the smaller fractional value has not been rounded (i.e., the shifted value is exact), then the shifted value is added to the one's complement of the other addend. The resulting negative number is the exact result −1. Thus, inverting this result gives the true exact result.

ii). For numbers with different signs and the same exponents—(i.e., subtracting one exact number from another). The inverse of the larger number is added to the smaller. The inverse of the adder unit 320 result is the exact result required.

iii). For numbers with the same signs—The rounding (if any) that occurs when the smaller fractional value is shifted is towards zero and so the two values can be just added together.

If the magnitude of the result from the adder unit 320 is less than 1, then a left shift is required to normalize the result, shifting in some rounding bit. The result can only be less than one when the signs of the inputs differ. Effectively we must establish the result to 25-bits of precision from the shifted out bits. This is actually quite straight forward and amounts to (7) last bit shifted out XOR unary-OR(all other bits shifted out)

As indicated above with respect to FIG. 5, the output from the multiplier module 220 is not normalized. This can cause problems when determining the larger input to the add stage of a muladd instruction. The scheme described above requires the smaller number SMALLER to be shifted and the larger LARGER to be inverted (if SIGN0 and SIGN1 differ). In some situations, the exponent comparison (via comparator 306) can incorrectly identify one of the exponents EXP0, EXP1 to be the largest. Since the mantissa from the multiplier arrives too late to allow a comparison prior to the input swapper unit 310, an incorrect identification of the larger number is detected later, setting a further variable input to the carry in generate logic 318 to make the necessary compensation in the adder unit 320 result.

Figure 8:
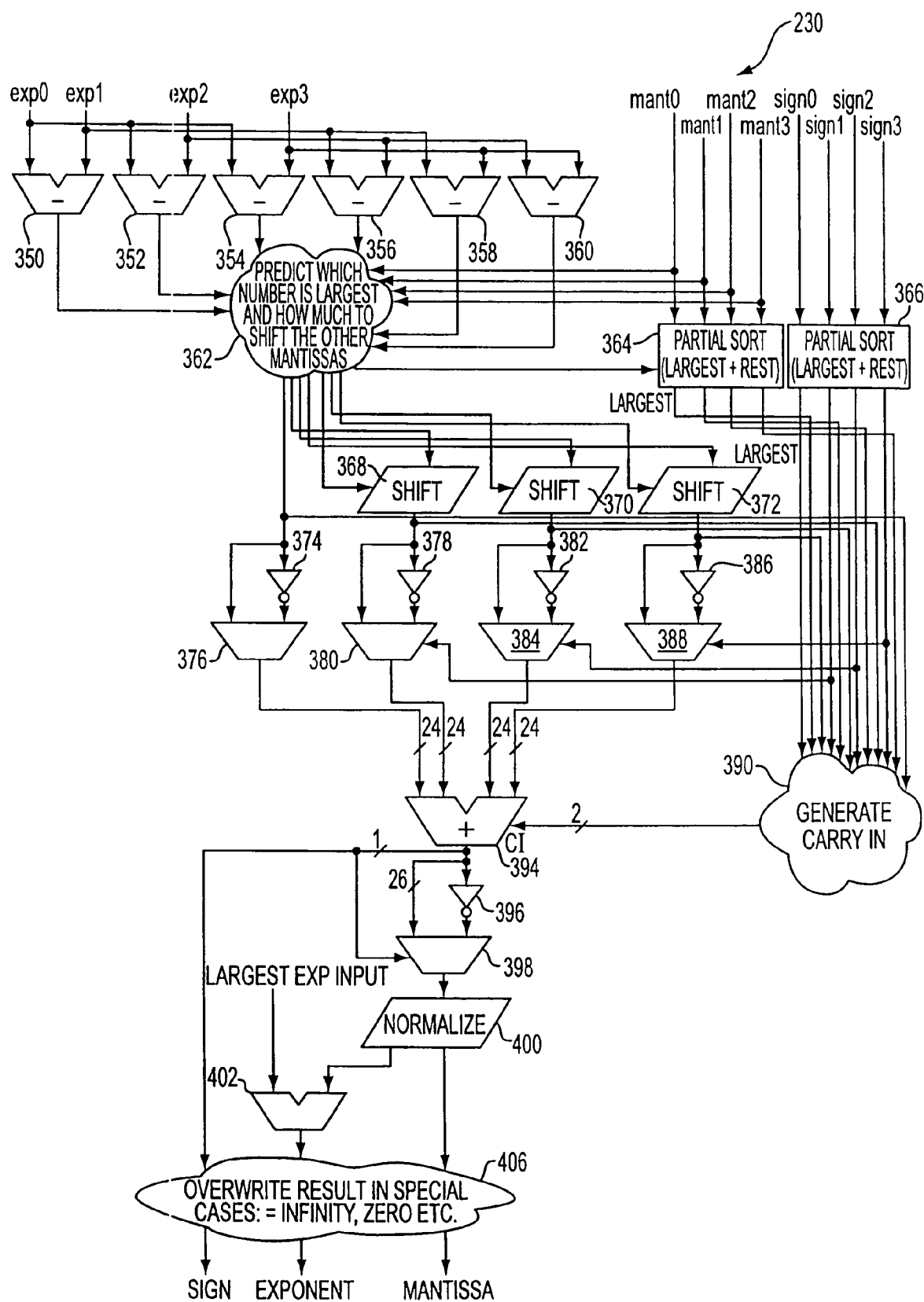
FIG. 8 is a block diagram illustrating a exemplary four-input floating point adder module used in the datapath illustrated in FIG. 4.
Figure 9:
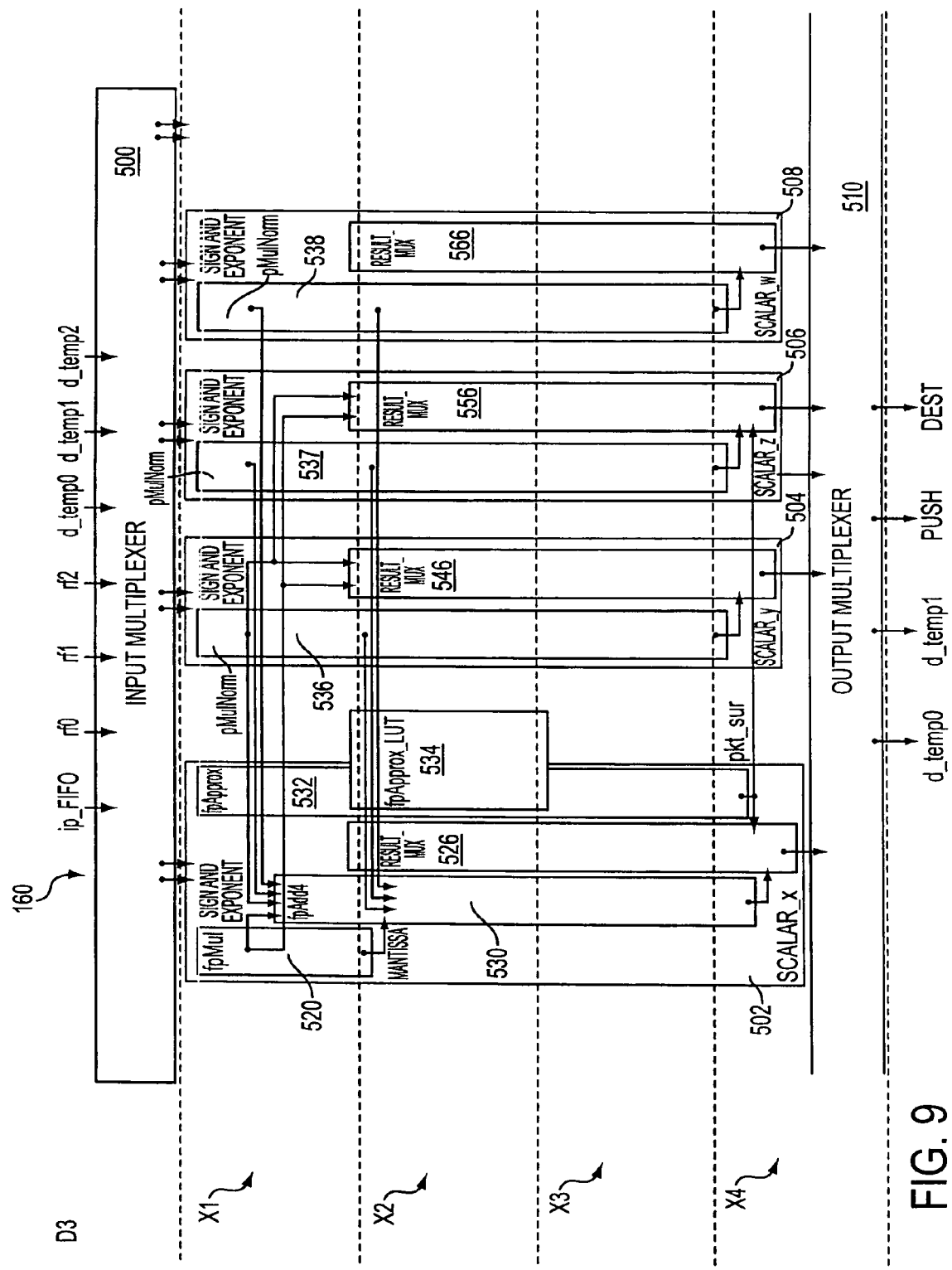
FIG. 9 is a block diagram illustrating an exemplary datapath used in the vertex engine illustrated in FIG. 3.

FIG. 8 is a block diagram illustrating a exemplary four-input floating point adder module 230 used in the first and second datapaths 150, 155 illustrated in FIG. 4 and module 530 used in the third datapath 160 illustrated in FIG. 9. The four-input adder module 230 is one of the key features of, and determines the overall performance of the first and second datapaths 150, 155 (FIG. 4). It should be noted that the four-input input floating point adder module 230 appears just once, in the scalar_x subsection in the present embodiment, where it accumulates the products from three or four of the scalars SCALAR_X, SCALAR_Y, SCALAR_Z, SCALAR_W when a dot3 or dot4 instruction is performed. This module 230 replaces the two-input module in the scalar_x subsection and thus, must exactly replicate the two-input adder module (e.g., module 248 illustrated in FIG. 7) for add and muladd instructions.

Early work made it clear that it would be very costly (in area) to produce a 100% accurate 4-input floating point adder module 230 that could be implemented in the budgeted pipeline. Therefore, a target was set to achieve a design that would be accurate to 22-bits of precision in the mantissa (i.e., an error in the lsb of the mantissa only is allowed. However, when the four-input adder module 230 is used as a two-input adder module, the addition must be correct to 23-bits. A quick comparison with FIG. 7 reveals that the architecture of the four-input adder module 230 is closely related to that of the two-input adder modules 248, 258, 268, which aids in the compatibility requirements mentioned above.

The four-input floating point adder module 230 is designed as a "flat" four-input adder (i.e., a+b+c+d) as opposed to a hierarchical two-input adder tree (i.e., (a+b)+(c+d)). This provides improved data throughput and significantly reduced gate count as will be discussed further below. The components of the module 230 include six subtraction units 350, 352, 354, 356, 358, 360, prediction logic 362, two partial sorter units 364, 366, three shifters 368, 370, 372, five inverters 374, 378, 382, 386, 396, five multiplexers 376, 380, 384, 388, 398, a normalize unit 400, two adder units 394, 402, a carry in generate unit 390 and output logic 406.

The module 230 is designed to input four floating point numbers. The first floating point number has a sign bit SIGN0, exponent portion EXP0 and a mantissa portion MANT0 (the output from the SCALAR_X multiply unit). The second floating point number has a sign bit SIGN1, exponent portion EXP1 and a mantissa portion MANT1 (the output from the SCALAR_Y multiply unit). The third floating point number has a sign bit SIGN2, exponent portion EXP2 and a mantissa portion MANT2 (the output from the SCALAR_Z multiply unit). The fourth floating point number has a sign bit SIGN3, exponent portion EXP3 and a mantissa portion MANT3 (the output from the SCALAR_W multiply unit). The output of the adder module 230 is a sign bit SIGN, exponent portion EXPONENT and mantissa portion MANTISSA of the resulting floating point number. The result of the adder module 230 is designed to achieve a round to zero result in accordance with the IEEE 754 standard, with the accuracy specified in Table II.

The first exponent portion EXP0 is input into the first three subtraction units 350, 352, 354. The second exponent portion EXP1 is input into the first, fourth and fifth subtraction units 350, 356, 358. The third exponent portion EXP2 is input into the second, fourth and sixth subtraction units 352, 356, 360. The fourth exponent portion EXP3 is input into the fourth, fifth and sixth subtraction units 354, 358, 360. The first subtraction unit 350 performs an EXP0-EXP1 operation, the second subtraction unit 352 performs an EXP0-EXP2 operation, the third subtraction unit 354 performs an EXP0-EXP3 operation, the fourth subtraction unit 356 performs an EXP1-EXP2 operation, the fifth subtraction unit 358 performs an EXP1-EXP3 operation, and the sixth subtraction unit 360 performs an EXP2-EXP3 operation. The subtraction operations are all performed in parallel.

The outputs of the six subtraction units 350, 352, 354, 356, 358, 360 are input to the prediction logic 362. Based on these inputs, the prediction logic 362 predicts which input number is the largest number and how much to shift the other mantissas (via shifters 368, 370, 372). The four mantissa portions MANT0, MANT1, MANT2, MANT3 are input into the first partial sorter unit 364. The four sign bits SIGN0, SIGN1, SIGN2, SIGN3 are input into the second partial sorter unit 366. Based on these inputs, the first and second partial sorter units 364, 366 output the true largest LARGEST and the rest of the mantissa and sign bits to the carry in generate logic 390 for further processing.

The outputs of the prediction logic 362 are distributed as follows. The mantissa of the largest number, based on the subtractions, is input into the first multiplexer 376 and first inverter 374. The remaining mantissa outputs are sent to the three shifters 368, 370, 372 along with an output that controls how much the mantissa should be shifted by its respective shifter 368, 370, 372. The outputs of the shifters 368, 370, 372 are respectively sent to the second, third and fourth multiplexers 380, 384, 388 and inverters 378, 382, 386. The second, third and fourth multiplexers 380, 384, 388 are controlled by the outputs of the second partial sorter unit 366.

The outputs of the first four multiplexers 376, 380, 384, 388 are input into the first adder unit 394 along with the carry in CI from the carry in bit generate logic 390. A sign bit output from the first adder unit 394 is input into the output logic 406 and the fifth multiplexer 398. The remaining output bits of the first adder unit 394 is input into the fifth multiplexer 398 and the fifth inverter 396. The fifth multiplexer 398 also inputs the output of the fifth inverter 396. The output of the fifth multiplexer 398 is controlled by the 1-bit sign bit portion output from the first adder unit 394. The output of the fifth multiplexer 398 is normalized by the normalize unit 400.

8-bits of the normalize unit 400 (the amount the output of multiplexer 398 had to be shifted to normalize it) are output to the second adder unit 402 and 23-bits of the normalize unit 400 (the normalized result such that the most significant 1 is at bit 23) are input to the output logic 406. The second adder unit 402 also inputs the largest exponent EXP0, EXP1, EXP2, EXP3 as determined by the prediction logic 362 and outputs a provisional exponent result to the output logic 402. The output logic 406 uses its inputs to construct the resultant output floating point number's sign bit SIGN, exponent portion EXPONENT and mantissa portion MANTISSA.

In operation, the four-input adder 230 identifies the largest input (based on the input exponents EXP0, EXP1, EXP2, EXP3) and routes that number's mantissa MANT0, MANT1, MANT2, MANT3 down a "non-shiftable" path and the remaining three mantissas MANT0, MANT1, MANT2, MANT3 down "shiftable" paths. The module 230 cannot be certain that this selection of the largest number is correct until it has compared the mantissas that are available some time after the exponent determinations. Thus, processing continues on the assumption (for now) that the correct choice has been made, while also being prepared to make compensations for an incorrect choice when generating the carry in CI.

Once the shifts are complete, the first add is performed by the first adder unit 394. If the signs of all the numbers are the same, then the unit 394 adds the shifted numbers and the generated carry in CI. If there is a mixture of positive and negative inputs, the module 230 first ensures that the largest number is positive, inverting all numbers if necessary (via inverters 374, 378, 382, 386 and multiplexers 376, 380, 384, 388). If a shifted number is exact after the shift (i.e., only 0's are shifted out), then the inverted value is the true value minus 1 and the carry in CI can restore the 1. If a non-zero value is shifted out, then that shifted value must be taken into account when calculating the final rounded result. To get a 100% accurate result, the shifted out values (potentially three of them) would have to be accumulated, with the sum being added to the final result, but this would be costly in both speed and area. Therefore, carry in generate logic 390 estimates the affect of the shifted out bits and sets the carry in CI to compensate accordingly.

A more detailed discussion of the carry in generate logic 390 now follows with reference to the example illustrated in Table III.

TABLE III

| Addends | Shifted out bits |
|---|---|
| +10100010100100111111011101 | |
| −11101100110101 | 0001011010 |
| −10111011110111100011 | 0000 |
| +10 | 1111111011001010110 |

A full precision round to zero result could be achieved by doing a 48-bit add and truncating to 24 bits. That 48-bit add is thought of as a fixed point 24.24F addition for the purpose of this description. A positive shifted number will have a fractional part $\geq 0.5$ if the last shifted out bit is equal to 1 (e.g., the fourth addend in Table III). If two positive shifted numbers have fractional parts $\geq 0.5$, then the net affect of those fractional parts will be to add 1 to the final result. If three positive numbers have fractional parts ≧0.5, then the net affect will be +1 or +2 to the rounded to zero result. Statistically +2 is more likely to be correct, but the logic 390 will ensure that the rounded value will always be less than the true value and thus, add 1.

As noted above, negative addends are inverted and thus, the negative number with non-zero bits shifted out (e.g., the second addend in Table III) is rounded towards minus infinity; a negative number with only zeros shifted out becomes the real value −1. Therefore, 1 should be added to the final result for each exact negative number (i.e., zeros only in the shifted bits). If two negative shifted numbers have fractional parts <0.5 (but >0), then the net affect of those fractional parts will be to subtract 1 (for rounding). Inverting the inputs reduces the result by 2 so a 1 must be added to get a correctly rounded to zero result. If three negative shifted numbers have fractional parts <0.5, then the net affect of those fractional parts will be to subtract 1 or 2 (with 1 being statistically more likely). The inversion of the three inputs subtracts 3 from the result so either 1 or 2 should be added. We opt for 1, based on the following reasoning.

Prior to the add there is no way of knowing whether the result is going to be positive or negative. However, since the largest number is positive, then for the result to be negative, two or more of the shifted numbers must be negative. Ideally a negative result should be two's complemented to give the magnitude of the result, but that would use up more valuable time and gates. Thus, in order for a 1's complement to give the correct result we need the negative number to be approximated towards minus infinity (hence the addition of 1 when three negative shifted numbers have fractional parts <0.5).

Selection of the 2-bit carry in CI value is based on how many of the shifted numbers are positive, and is summarized by Table IV (assume carry in CI is 0 when conditions do not satisfy an entry in Table IV).

TABLE IV

| No. of shifted numbers | Carry in CI | | |
|---|---|---|---|
| | 1 | 2 | 3 |
| 0 | C xor F | (C and F) xor D | E |
| 1 | A xor C or F | (A and C) xor (A and F) xor D | A and D |
| 2 | A xor B or C | (A and B) xor (A and C) xor (B and C) | A and B and C |
| 3 | A xor B | A and B | |

Where A=the largest input to the adder has been inverted (to make it positive) so a 1 must be added at the carry in CI to effectively make that inversion a two's complement.; B=at least two of the positive shifted inputs have the last bit shifted out=1; C=one negative input (other than the largest) is exact (not shifted, or zeros only shifted out); D=two negative inputs (other than the largest) are exact (not shifted, or zeros only shifted out); E=three negative inputs (other than the largest) are exact (not shifted, or zeros only shifted out); and F=at least 2 of the negative inputs each have the last bit shifted out=0 & a non-zero shifted bit. These carry in CI values ensure that the result of the 24-bit add is within one of the correct results rounded towards zero.

Unique features of the four-input adder module 230 are its close coupling with the four floating point multiplier modules 220, 240, 250, 260 (FIG. 4), which ensures that the early processing stages of the add are performed prior to the completion of the multiply operation. Another unique feature of the module 230 is the early prediction of the largest operand, which ensures that the path for one mantissa addend does not need to include a barrel shifter. This removes a significant number of gates from the invention since the cell area of one barrel shifter is more than 7% of the area of the entire adder module 230. Moreover, two's complement units are not used in the four-input adder module 230. Instead, inverters 374, 378, 382, 386, 396 are used.

Another unique feature of the module 230 is that the carry in generate logic 390 computes a 2-bit value that is added to the sum of the four mantissa portions MANT0, MANT1, MANT2, MANT3. In doing so, the logic 390 corrects any error resulting from a mis-prediction of the largest number (e.g., prediction logic 362), corrects inaccuracies introduced by approximating a negative addend or result to its one's complement equivalent, and takes into account the effect of the shifted-out bits when calculating the sum rounded to zero (although other rounding choices could be made).

Each multiplier module 220, 240, 250, 260 are closely coupled to an adder module 230, 248, 258, 268, which maximizes throughput and minimizes area overhead. By closely coupling the adder modules 230, 248, 258, 268 (FIG. 4) of the present invention with the multiplier modules 220, 240, 250, 260 (FIG. 4), each multiplier module 220, 240, 250, 260 obtains the architectural advantage that is mantissa products can be passed to the adder modules 230, 248, 258, 268 for normalizing. As noted earlier, all two's complement units are replaced with straight inversions of a negative addend or a negative result. The carry in generate logic 318 (FIG. 7) of the two input adder modules 248, 258, 268 (FIG. 7), like the logic 390 of the four-input adder module 230 (FIG. 8), corrects errors that would be introduced due to mis-prediction of the larger input, disregard of the shifted-out bits of the smaller addend, and the approximating of a negative addend/result to its one's complement equivalent. This ensures that the result always equals the true rounded to zero result, within the accuracy bounds previously noted.

Accordingly, the multiple datapaths 150, 155 of the vertex engine 100 are capable of performing a four component dot product in a single pass through the datapath 150, 155. As noted earlier, this means that the input vertex data passes through the datapath 150, 155 a single time and all the required computations are performed during that same time. This allows vertex transformations to be computed in an efficient manner, with a high data. throughput and without substantially increasing the cost and amount of hardware required to implement the vertex engine datapath (FIG. 3).

Referring again to FIG. 4, a brief description of the fractional modules 224, 244, 254, 264 is now provided. In a desired embodiment, each fractional module 224, 244, 254, 264 is identical. Thus, for convenience purposes, the fractional modules 224, 244, 254, 264 are described with reference to module 224. The "FRAC" instruction is defined as follows:

(8) result.x=s.x−truncateToMinusInfinity(s.x);
(9) result.y=s.y−truncateToMinusInfinity(s.y);
(10) result.z=s.z−truncateToMinusInfinity(s.z); and
(11) result.w=s.w−truncateToMinusInfinity(s.w).

The subtraction is handled by the adder modules 230, 248, 258, 268, while the "frac" module 224 performs the "truncateToMinusInfinity" operation. This function is equivalent to the C library function "floor." Fundamentally, there is a need to remove the fractional part of the input. That is, the module 224 must de-normalise the input, truncate the fractional bit, and return to floating point format. To balance the pipeline this must be completed in a similar time to that taken by the multiplier to generate the output EXPONENT (FIG.

5). The module 224 must be a bit cleverer than just truncating the fractional bit since it is actually required to truncate towards minus infinity. For positive numbers, the module 224 can just truncate the fractional part of the floating point number (i.e., set all bits corresponding to the fractional part of the de-normalized number to "0"), but for a negative number it should truncate the fractional portion and then add 1. An increment unit would be costly with respect to time, therefore, for negative numbers the module 224 sets all bits corresponding to the fractional part of the de-normalized number to "1" and in the adder modules 230, 248, 258, 268 the carry in CI is forced to 1. Accordingly, the basic "truncateToMinusInfinity" has been simplified to the following: (1) if the "real exponent" (biased exponent−127) is greater than 22 then truncateToMinusInfinity(s)=s; (2) if the "real exponent" is less than 0 then truncateToMinusInfinity(sign)=s(sign), truncateToMinusInfinity(biased_exponent)=0 when s(sign)=0, or 127 when s(sign)=1, and truncateToMinusInfinity(mantissa)=0; or (3) truncateToMinusInfinity(sign)=s(sign), truncateToMinusInfinity(biased_exponent)=s(biased_exponent), truncateToMinusInfinity(mantissa)=s(mantissa) & ~mask when s(sign)=0, and s(mantissa)|mask when s(sign)=1, where mask=(23'h7fffff>>real_exponent, i.e., unbiased), and carryin_to_adder=s(sign).

Where 0≦real exponent <23 is the only one that requires computation with the critical path being through the mask generation. This path can be substantially shortened if we remove the need to pre-calculate the real exponent for the mask generation. This can be done by effectively shifting the mask by 1 prior to shifting by biased_exponent[4:0] and introducing one additional special case: if the "real exponent" equals 0 then truncateToMinusInfinity(sign) s(sign), truncateToMinusInfinity(biased_exponent)=s(biased_exponent)=127, truncateToMinusInfinity(mantissa)=0 when s(sign)=0 and 23'h7fffff when s(sign)=1, and carryin_to_adder=s(sign).

FIG. 9 is a block diagram illustrating an exemplary datapath 160 used in the VE 100 illustrated in FIG. 3. In the illustrated datapath, one scalar subsection 502, 504, 506, 508 must include a four-input floating point adder module 530 (also denoted as "fpAdd4") to complete these instructions. The four-input adder module 530 is substantially the same as the module 230 illustrated in FIG. 8 and is not discussed further. In the illustrated embodiment, the four-input adder module 530 has been arbitrarily assigned to the first scalar subsection 502 (e.g., SCALAR_X). It should be appreciated that the four-input adder module 530 could have been assigned to any of the subsections 502, 504, 506, 508 and the invention is not to be limited to the illustrated embodiment.

It must be noted that the third datapath 160 in the exemplary vertex engine 100 (FIG. 3) may be an exact implementation of the datapaths 150, 155 or some other datapath. It must, however, have the ability to compute a four component dot product.

The vertex engine is scalable (i.e., the number of 128-bit datapaths is variable according to the specific design requirements). The exemplary design includes 3 datapaths. This allows a 3*3 matrix transformation to be computed in a single pass if each datapath executes a 3 input dot product in parallel. A full 4*4 matrix transformation could be completed. in one pass through the vertex engine with four such datapaths. Clearly, the number of datapaths will be scaled to trade-off between area limitations and performance requirements.

FIG. 10 is a block diagram illustrating an exemplary processor-based system 600 utilizing a graphics pipeline 50 constructed in accordance with the invention. The processor-based system 600 may be a computer system, a process control system or any other system employing a processor. The system 600 includes a central processing unit (CPU) 602, e.g., a microprocessor, that communicates with the pipeline 50 and an input/output (I/O) device 604 over a bus 620. It must be noted that the bus 620 may be a series of buses and bridges commonly used in a processor-based system, but for convenience purposes only, the bus 620 has been illustrated as a single bus. A display 606 is also connected to the bus 620. The processor-based system 600 may also include a random access memory (RAM) device 608 and a read-only memory (ROM) device 610, and peripheral devices such as a floppy disk drive and a compact disk (CD) ROM drive (not shown) that also communicate with the CPU 602 over the bus 620 as is well known in the art.

While the invention has been described and illustrated with reference to exemplary embodiments, many variations can be made and equivalents substituted without departing from the spirit or scope of the invention. Accordingly, the invention is not to be understood as being limited by the foregoing description, but is only limited by the scope of the appended claims.

What is claimed as new and desired to be protected by Letters Patent of the United States is:

1. A digital circuit configured as an arithmetic pipeline, said circuit comprising:
   a flat four-input single precision floating point adder module, said module being controllable to add first, second, third and fourth single precision floating point numbers and to output a resulting single precision floating point number, said module comprising:
   means for predicting a largest number from exponent and mantissa portions of said floating point numbers, said predicting means outputting a plurality of shifting data calculated based on said largest number and said exponent portions;
   means for partially sorting said floating point numbers based on sign-bit and the exponent portions of said floating point numbers, said sorting means outputting sorted mantissas, sorted exponents, and sorted sign-bits;
   carry-in generation means for outputting carry-in data based on said sorted sign-bits and mantissas:
   addition logic receiving the carry-in data and said sorted mantissas and said plurality of shifting data, said addition logic calculating and outputting a normalized mantissa output and exponent modifier; and
   output logic receiving the normalized mantissa output, exponent modifier, and a largest exponent, said output logic outputting the resulting floating point number based on the normalized mantissa output, the exponent modifier, and the largest exponent.

2. The digital circuit of claim 1, wherein all arithmetic negations are approximated to a logical negation and said carry-in generation means generates the carry-in data to correct said approximations.

3. The digital circuit of claim 1, wherein said carry-in generation means generates the carry-in data to correct any loss of precision that may have occurred in shifting of non-largest mantissas by said addition logic.

4. The dicital circuit of claim 1, wherein said carry-in generation means generates the carry-in data to correct incorrect determinations of which floating point number is larger.

5. The digital circuit of claim 1, wherein said carry-in generation means generates the carry-in data to correctly round the resulting single precision floating point number to meet rounding mode requirements.

6. The digital circuit of claim 1 further comprising a floating point multiplier module, said multiplier module inputs the input data and performs a multiply operation and said four-input single precision floating point adder module performs a normalization operation on a result of the multiply operation.

7. A flat four-input single precision floating point adder module, said module being controllable to add first, second, third and fourth single precision floating point numbers and to output a resulting single precision floating point number, said module comprising:
- means for predicting a largest number from exponent and mantissa portions of said floating point numbers, said predicting means outputting a plurality of shifting data calculated based on said largest number and said exponent portions;
- means for partially sorting said floating point numbers based on sign-bit and the exponent portions of said floating point numbers, said sorting means outputting sorted mantissas, sorted exponents, and sorted sign-bits;
- carry-in generation means for outputting carry-in data based on said sorted sign-bits and mantissas;
- addition logic receiving the carry-in data and said sorted mantissas and said plurality of shifting data, said addition logic calculating and outputting a normalized mantissa output and exponent modifier; and
- output logic receiving the normalized mantissa output, exponent modifier, and a largest exponent, said output logic outputting the resulting floating point number based on the normalized mantissa output, the exponent modifier, and the largest exponent.

8. The module of claim 7, wherein all arithmetic negations are approximated to a logical negation and said carry-in generation means generates the carry-in data to correct said approximations.

9. The module of claim 7, wherein said carry-in generation means generates the carry-in data to correct any loss of precision that may have occurred in shifting of non-largest mantissas by said addition logic.

10. The module of claim 7, wherein said carry-in generation means generates the carry-in data to correct incorrect determinations of which floating point number is larger.

11. The module of claim 7, wherein said carry-in generation means generates the carry-in data to correctly round the resulting single precision floating point number to meet rounding mode requirements.

12. The module of claim 7, further comprising a floating point multiplier module, said multiplier module inputs the input data and performs a multiply operation and said four-input single precision floating point adder module performs a normalization operation on a result of the multiply operation.

13. A processor executing arithmetic operations on vertex data comprising a flat four-input single precision floating point adder module, said module being controllable to add first, second, third and fourth single precision floating point numbers and to output a resulting single precision floating point number, said module comprising:
- means for predicting a largest number from exponent and mantissa portions of said floating point numbers, said predicting means outputting a plurality of shifting data calculated based on said largest number and said exponent portions;
- means for partially sorting said floating point numbers based on sign-bit and the exponent portions of said floating point numbers, said sorting means outputting sorted mantissas, sorted exponents, and sorted sign-bits;
- carry-in generation means for outputting carry-in data based on said sorted sign-bits and mantissas;
- addition logic receiving the carry-in data and said sorted mantissas and said plurality of shifting data, said addition logic calculating and outputting a normalized mantissa output and exponent modifier; and
- output logic receiving the normalized mantissa output, exponent modifier, and a largest exponent, said output logic outputting the resulting floating point number based on the normalized mantissa output, the exponent modifier, and the largest exponent.

14. The processor executing arithmetic operations on vertex data of claim 13, wherein all arithmetic negations are approximated to a logical negation and said carry-in generation means generates the carry-in data to correct said approximations.

15. The processor executing arithmetic operations on vertex data of claim 13, wherein said carry-in generation means generates the carry-in data to correct any loss of precision that may have occurred in shifting of non-largest mantissas by said addition logic.

16. The processor executing arithmetic operations on vertex data of claim 13, wherein said carry-in generation means generates the carry-in data to correct incorrect determinations of which floating point number is larger.

17. The processor executing arithmetic operations on vertex data of claim 13, wherein said carry-in generation means generates the carry-in data to correctly round the resulting single precision floating point number to meet rounding mode requirements.

18. The processor executing arithmetic operations on vertex data of claim 13, further comprising a floating point multiplier module, said multiplier module inputs the input data and performs a multiply operation and said four-input single precision floating point adder module performs a normalization operation on a result of the multiply operation.

* * * * *

UNITED STATES PATENT AND TRADEMARK OFFICE
CERTIFICATE OF CORRECTION

PATENT NO.       : 7,392,274 B2  
APPLICATION NO.  : 10/786332  
DATED            : June 24, 2008  
INVENTOR(S)      : Shaw Page 1 of 1

It is certified that error appears in the above-identified patent and that said Letters Patent is hereby corrected as shown below:

In column 18, line 41, in Claim 1, delete "mantissas:" and insert -- mantissas; --, therefor.

In column 18, line 59, in Claim 4, delete "dicital" and insert -- digital --, therefor.

In column 19, line 16, in Claim 7, delete "outputfing" and insert -- outputting --, therefor.

Signed and Sealed this

Twenty-sixth Day of August, 2008

JON W. DUDAS  
*Director of the United States Patent and Trademark Office*